United States Patent
Gedenk et al.

(10) Patent No.: US 7,934,458 B2
(45) Date of Patent: May 3, 2011

(54) RAILWAY BOGIE

(75) Inventors: Volker Gedenk, Hemmingen (DE); Friedrich Hoppmann, Hemmingen (DE); Rolf Schmiechen, Schwebheim (DE); John Skiller, Soest (NL)

(73) Assignees: AB SKF, Göteborg (SE); Contitech Luftfedersysteme GmbH, Hannover (DE)

( * ) Notice: Subject to any disclaimer, the term of this patent is extended or adjusted under 35 U.S.C. 154(b) by 796 days.

(21) Appl. No.: 10/594,084

(22) PCT Filed: Mar. 26, 2004

(86) PCT No.: PCT/EP2004/003197
§ 371 (c)(1),
(2), (4) Date: Mar. 12, 2007

(87) PCT Pub. No.: WO2005/091698
PCT Pub. Date: Oct. 6, 2005

(65) Prior Publication Data
US 2007/0175356 A1   Aug. 2, 2007

(51) Int. Cl.
*B61F 5/26* (2006.01)
(52) U.S. Cl. ............ 105/218.1; 105/198.7; 105/197.05
(58) Field of Classification Search .............. 105/218.1, 105/224.05, 224.1, 198.7, 197.05; 267/140.13
See application file for complete search history.

(56) References Cited

U.S. PATENT DOCUMENTS

| | | | | |
|---|---|---|---|---|
| 3,961,582 A * | 6/1976 | Paton et al. | ........................ | 105/3 |
| 3,961,584 A * | 6/1976 | Paton et al. | ................. | 105/198.7 |
| 4,399,987 A | 8/1983 | Cucelli et al. | | |
| 4,502,391 A * | 3/1985 | Hurni | ......................... | 105/157.1 |
| 5,611,284 A * | 3/1997 | Smith et al. | .................... | 105/220 |
| 6,595,504 B2 * | 7/2003 | Gedenk | ......................... | 267/294 |
| 2002/0089102 A1 * | 7/2002 | Gedenk | .................... | 267/140.13 |
| 2002/0089103 A1 * | 7/2002 | Gedenk | .................... | 267/140.13 |
| 2007/0175356 A1 * | 8/2007 | Gedenk et al. | ............ | 105/224.1 |
| 2008/0229968 A1 * | 9/2008 | Gedenk et al. | ............ | 105/198.7 |

FOREIGN PATENT DOCUMENTS

| | | |
|---|---|---|
| EP | 1 369 616 A1 | 12/2003 |
| EP | 1369616 A1 * | 12/2003 |
| GB | 931588 | 7/1963 |
| JP | 57-040139 A | 3/1982 |
| JP | 32-000861 | 9/1991 |
| JP | 10-148233 A | 6/1998 |
| JP | 11-094008 A | 4/1999 |
| JP | 11-094010 A | 4/1999 |
| JP | 11-094012 A | 4/1999 |
| JP | 11-278263 A | 10/1999 |

(Continued)

OTHER PUBLICATIONS

"Air Spring Systems for Modern Rail Vehicles", ContiTech Spring Systems, pp. 1-20, ContiTech Luftfedersysteme GmbH, Hannover, Germany, Oct. 1998.

(Continued)

*Primary Examiner* — S. Joseph Morano
*Assistant Examiner* — Jason C Smith
(74) *Attorney, Agent, or Firm* — Buchnanan Ingersoll & Rooney PC

(57) ABSTRACT

An axlebox-spring-unit of a railway bogie includes at least one hydraulic spring having a housing required for functionality of the hydraulic spring, and an axlebox. At least a part of the axlebox forms at least a part of the housing.

23 Claims, 2 Drawing Sheets

FOREIGN PATENT DOCUMENTS

RU    1188033    10/1985

OTHER PUBLICATIONS

Official Action issued by the Russian Patent Office with English Language Translation.

Official Action issued by the Chinese Patent Office with English Language Translation.

Gedenk, Volker, et al., U.S. Appl. No. 11/971,135, "Railway Bogie," filed Jan. 8, 2008 (IFW available in U.S. Patent and Trademark Office database).

Notification of Reasons for Rejection issued in corresponding Japanese Application No. 2007-504260 dated Sep. 1, 2009 with English-language Translation.

\* cited by examiner

RAILWAY BOGIE

FIELD OF THE INVENTION

The invention relates to a railway bogie comprising at least one hydraulic spring having a housing being required for a functionality of the hydraulic spring and an axlebox.

BACKGROUND DISCUSSION

From UIC standard a bogie with helical springs is well known, whereby the axlebox suspension consists of helical springs in combination with friction damping. Thereby the springs rest on support arms integral with the lower part of the axlebox housing and are connected with the bogie frame using caps integral with the bogie frame for taking up the top of the springs.

US 2002-0089102 A1 discloses a hydraulic spring comprising a membrane. This document also discloses that the hydraulic spring is for use in rail vehicles especially as a primary spring.

Further the catalogue of the company ContiTech Luftifedersysteme GmbH in Hannover, Germany, "Air Spring Systems for Modem Rail Vehicles", printed and distributed in October 1998 discloses the use of hydraulic springs comprising a membrane in two-axle bogies.

One object of the present invention is to provide an improved railway bogie comprising at least an axlebox and a hydraulic spring, so that the railway bogie has a simplified build-up and is therewith cheaper to produce.

SUMMARY

According to one aspect, a railway bogie comprises at least one hydraulic spring having a housing required for operativeness of the hydraulic spring and an axlebox, wherein at least a part of the axlebox forms at least a part of the housing.

By the fact that an existing part of the axlebox is designed and used to form a part of the housing of the hydraulic spring, the number of components is reduced in total so that a lower fault liability and a more favorable cost position can be achieved.

BRIEF DESCRIPTION OF THE DRAWING FIGURES

Further advantages, features and details of the invention are described with respect to one preferred embodiment of the invention with reference to the accompany drawings.

DETAILED DESCRIPTION

Figure 1:
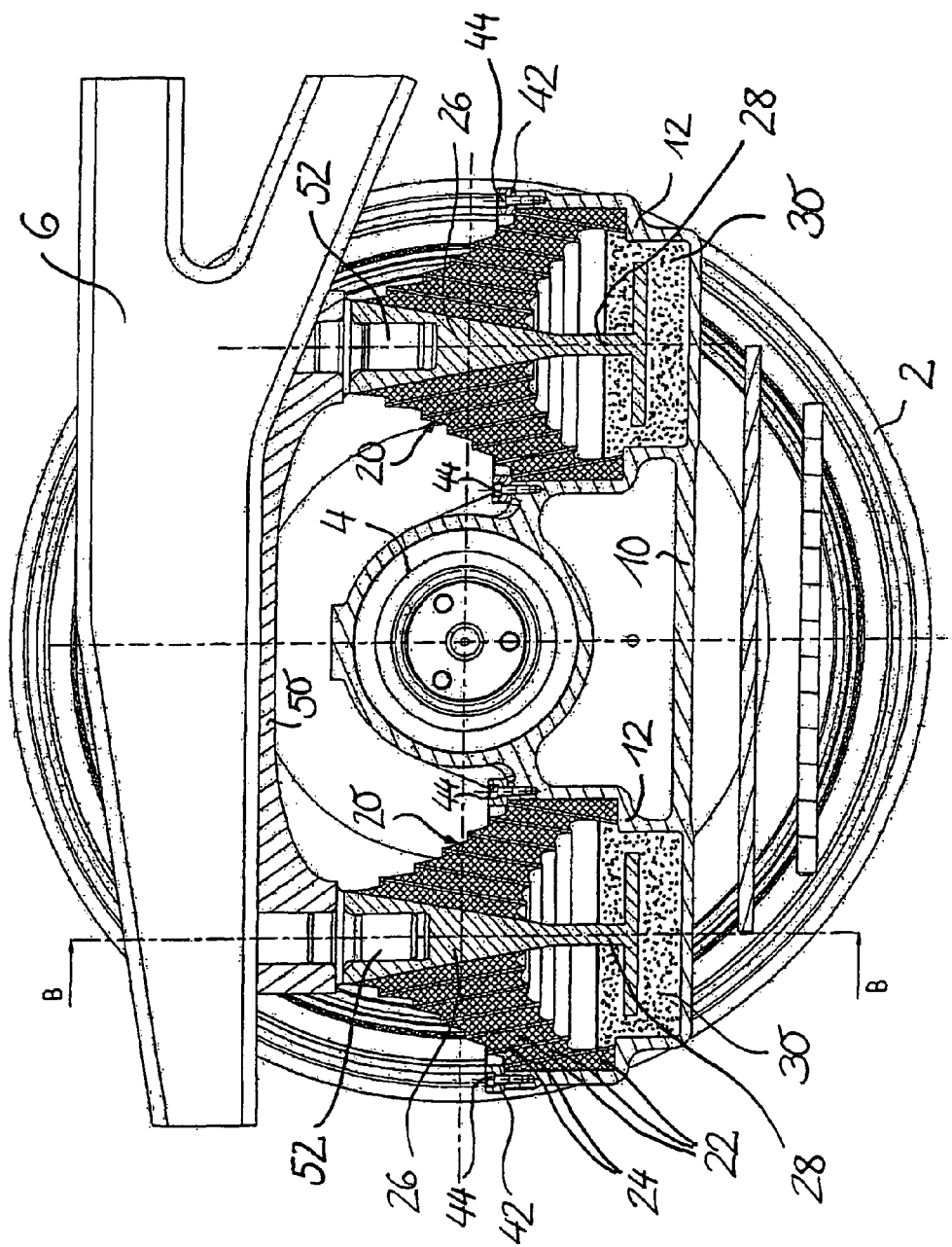
FIG. 1 is a longitudinal cross section in the region of one wheel of a bogie.

FIG. 1 shows a longitudinal cross section in the region of one wheel 2 of a bogie of the so-called Y 25 type, whereby the cut is directed along a plane defined by the axes of rotational symmetry of a first and second hydraulic spring. The pictured section of the bogie comprises an axlebox 10 with a rolling bearing 4 mounted in a middle region of the axlebox 10. The rolling bearing 4 supports one end of one of the two axles of the bogie.

A base of the axlebox 10 is extended to the left and the right side forming a cup shaped region 12 at each of the sides. Each of the hydraulic springs comprises a spring element 20, which is attached to each of the cup shaped regions 12 of the axlebox 10. A metallic centerpiece 26 is located in the centre of each of the spring elements 20.

These two centerpieces 26 are attached to one bridging adapter 50. Therefore the centerpieces 26 and the bridging adapter 50 have bores for connecting the centerpieces 26 with the bridging adapter 50 via two bolts 52 pictured uncut in FIGS. 1 and 2. In other embodiments, the bolts 52 can be integral parts of the centerpieces 26 or of the bridging adapter 50, or the centerpieces 26 can be connected to the bridging adapter 50 by any other connecting means.

The bridging adapter 50 is attached to a longeron of a frame 6 of the bogie. This longeron extends in a longitudinal direction parallel to the rails and is pictured uncut in FIG. 1. Preferably the bridging adapter 50 is connected to the bogie frame 6 by welding.

Figure 2:
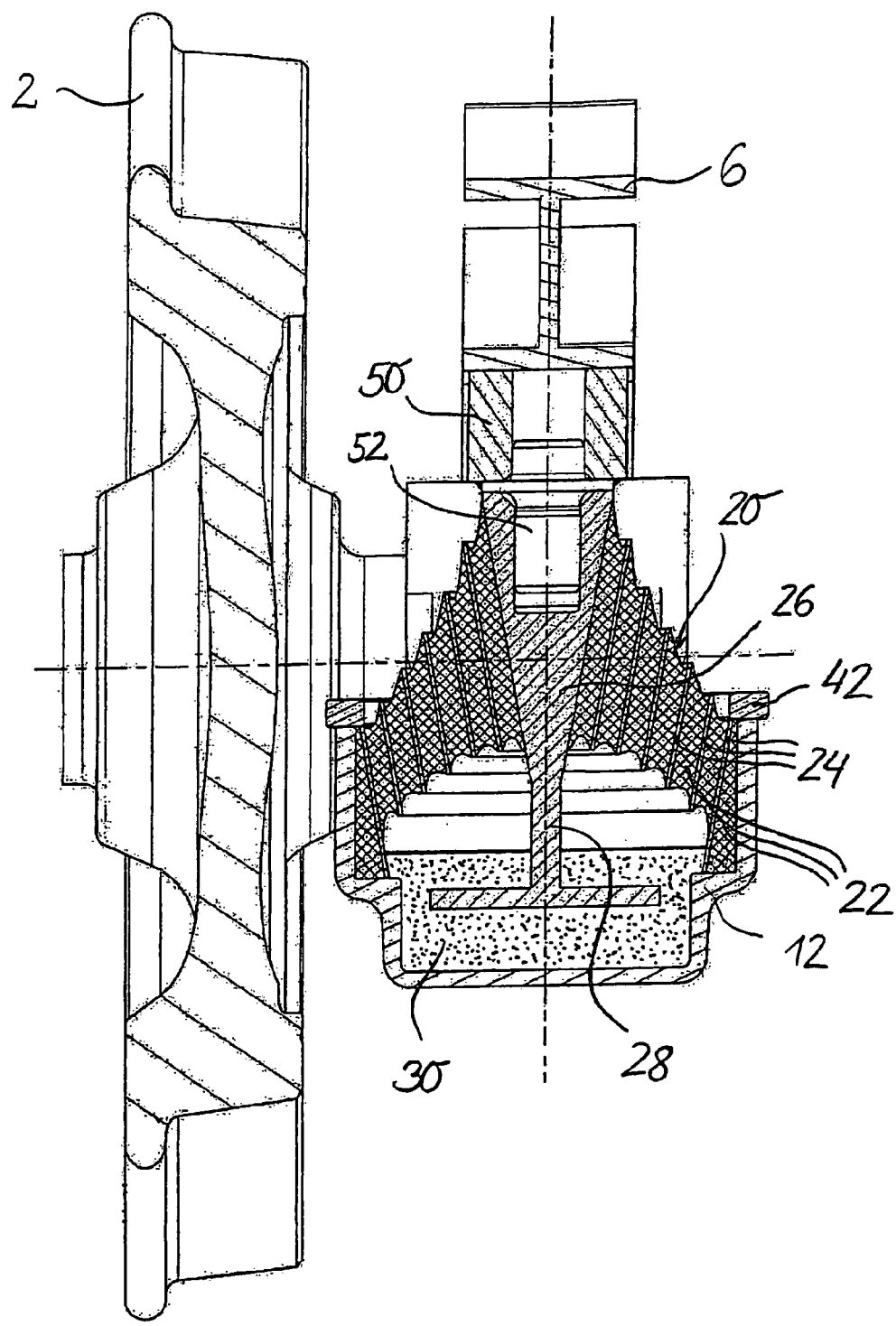
FIG. 2 is a sectional view along the line B-B of FIG. 1.

In the following description, just the left cup shaped region 12 in connection with the left spring element 20 is described in detail, because the same applies to the right cup shaped region 12 in connection with the right spring element 20. Therefore FIG. 2 shows a sectional view along the line B-B of FIG. 1. The spring element 20 comprises sleeve shaped elastomeric elements 22 and intermediate sleeve shaped metallic elements 24 in an alternating succession, whereby the elastomeric and the metallic elements 22 and 24 are connected by way of vulcanization. Also the centerpiece 26 is connected by way of vulcanization to its adjacent elastomeric element 22.

The spring element 20 is secured to the respective cup shaped region 12 of the axlebox 10 via a sealing ring 42, which is attached to the axlebox 10 via screws 44. In other embodiments the spring element 20 also can be directly vulcanized to the cup shaped region 12. The spring elements 20 forms together with the respective cup shaped region 12 of the axlebox 10 a volume for a fluid 30 particularly a hydraulic fluid. This volume is at least partly filled with the fluid 30. The centerpiece 26 is prolonged into the volume forming a plunger shaped region 28. Thereby at least a disk shaped region at the end of the plunger shaped region 28 is dipped into the fluid 30, so that this arrangement fulfils the function of a damper. The cup shaped region 12 of the axlebox 10 together with the respective spring element 20 and the fluid 30 form together the hydraulic spring.

In another embodiment of the invention, a hydraulic spring can be used, e.g. according to the already cited US 2002-0089102 A1, comprising a membrane instead of the plunger shaped section 28 of the centerpiece 26, whereby the cup shaped region 12 of the axlebox 10 is then also one part of the housing of the hydraulic spring.

The invention claimed is:

1. Axlebox-spring-unit of a railway bogie comprising at least one hydraulic spring having a housing being required for a functionality of said hydraulic spring and an axlebox, at least a part of said axlebox forming at least a part of said housing, and at least an elastomeric portion of a spring element of the at least one hydraulic spring being provided in a hydraulic fluid of the hydraulic spring.

2. Axlebox-spring-unit of a railway bogie of claim 1, whereby said part of said axlebox comprises a cup shaped region of said axlebox.

3. Axlebox-spring-unit of a railway bogie of claim 1, whereby said part of said axlebox forms at least a part of a boundary of a volume for a hydraulic fluid of said hydraulic spring.

4. Axlebox-spring-unit of a railway bogie comprising at least one hydraulic spring having a housing being required for a functionality of said hydraulic spring and an axlebox, at least a part of said axlebox forming at least a part of said housing, whereby a spring element of said hydraulic spring is directly connected to an upstanding wall of said part of said axlebox.

5. Axlebox-spring-unit of a railway bogie of claim 4, whereby said spring element comprises at least one elastomeric element which is directly attached to said part of said axlebox.

6. Axlebox-spring-unit of a railway bogie of claim 4, whereby said part of said axlebox forms at least a part of a boundary of a volume for a hydraulic fluid of said hydraulic spring and said spring element comprises a centerpiece which extends into said volume for said hydraulic fluid forming a plunger shaped region.

7. Axlebox-spring-unit of a railway bogie of claim 4, whereby said spring element comprises elastomeric elements and rigid elements in alternating succession.

8. Axlebox-spring-unit of a railway bogie of claim 7, whereby said elastomeric and rigid elements are sleeve shaped.

9. Axlebox-spring-unit of a railway bogie of claim 7, whereby said elastomeric elements are connected to said rigid elements by way of vulcanization.

10. Axlebox-spring-unit of a railway bogie of claim 7, wherein said part of said axlebox forms at least a part of a boundary of a volume for a hydraulic fluid of said hydraulic spring, and said spring element comprises a centerpiece which extends into said volume for said hydraulic fluid forming a plunger shaped region, said elastomeric elements being connected to said centerpiece by vulcanization.

11. Axlebox-spring-unit of a railway bogie of claim 4, wherein the spring element is secured to the axlebox via a sealing device provided at the upstanding wall.

12. Axlebox-spring-unit of a railway bogie comprising at least one hydraulic spring having a housing being required for a functionality of said hydraulic spring and an axlebox, at least a part of said axlebox forming at least a part of said housing, whereby a spring element of said hydraulic spring is directly connected to said part of said axlebox and said spring element is secured to said axlebox via a sealing device.

13. Axlebox-spring-unit of a railway bogie of claim 12, whereby said sealing device is a ring screwed on said part of said axlebox.

14. Axlebox-spring-unit of a railway bogie comprising:
   an axlebox comprising at least one cup-shaped region;
   at least one hydraulic spring adapted to be connected to a frame of the bogie;
   a spring element of the at least one hydraulic spring being secured directly to the axlebox to define together with the cup-shaped region a volume for receiving a hydraulic fluid,
   wherein said hydraulic spring is secured to the axlebox by way of a sealing ring.

15. Axlebox-spring-unit of a railway bogie of claim 14, wherein the sealing ring is secured to a portion of the cup-shaped region of the axlebox by a screw.

16. Axlebox-spring-unit of a railway bogie of claim 14, wherein the hydraulic spring comprises a plurality of elastomeric elements, one of the elastomeric elements being directly secured to a portion of the cup-shaped region of the axlebox.

17. Axlebox-spring unit of a railway bogie of claim 14, further comprising a centerpiece attached to the hydraulic spring for connecting the hydraulic spring to the frame of the bogie, the centerpiece extending in the volume.

18. Axlebox-spring-unit of a railway bogie of claim 14, wherein the hydraulic spring comprises elastomeric elements and rigid elements arranged in an alternating manner.

19. Axlebox-spring-unit of a railway bogie of claim 14, wherein the at least one cup shaped region is a first cup-shaped region and the at least one hydraulic spring is a first hydraulic spring secured to portion of the first cup-shaped region of the axlebox, the axlebox comprising a second cup-shaped region, and a second hydraulic spring secured to a portion of the second cup-shaped region to define together with the second cup-shaped region a volume for receiving hydraulic fluid.

20. Axlebox-spring-unit of a railway bogie of claim 19, wherein the second hydraulic spring is secured to the second cup-shaped region of the axlebox by way a sealing ring and screw.

21. Axlebox-spring-unit of a railway bogie comprising at least one hydraulic spring having a housing being required for a functionality of said hydraulic spring and an axlebox, at least a part of said axlebox forming at least a part of said housing, and said part of the axlebox forms together with a spring element of the hydraulic spring a boundary that completely contains a hydraulic fluid of the hydraulic spring.

22. Axlebox-spring-unit of a railway bogie comprising at least one hydraulic spring having a housing being required for a functionality of said hydraulic spring and an axlebox, at least a part of said axlebox forming at least a part of said housing, whereby a spring element of said hydraulic spring is directly vulcanized to said part of said axlebox.

23. Axlebox-spring-unit of a railway bogie comprising:
   an axlebox comprising at least one cup-shaped region;
   at least one hydraulic spring adapted to be connected to a frame of the bogie;
   a spring element of the at least one hydraulic spring being vulcanized directly to the axlebox to define together with the cup-shaped region a volume for receiving a hydraulic fluid.

* * * * *